United States Patent

(12) United States Patent
Herrmann

(10) Patent No.: US 7,057,668 B2
(45) Date of Patent: Jun. 6, 2006

(54) COLOR/MONO SWITCHED DISPLAY

(75) Inventor: Frederick P. Herrmann, Sharon, MA (US)

(73) Assignee: Kopin Corporation, Taunton, MA (US)

( * ) Notice: Subject to any disclaimer, the term of this patent is extended or adjusted under 35 U.S.C. 154(b) by 576 days.

(21) Appl. No.: 10/127,338

(22) Filed: Apr. 19, 2002

(65) Prior Publication Data

US 2003/0197674 A1 Oct. 23, 2003

(51) Int. Cl.
H04N 9/12 (2006.01)

(52) U.S. Cl. .................................... 348/554

(58) Field of Classification Search ............... 348/554, 348/523, 524, 503, 521; 345/7, 8, 98, 58
See application file for complete search history.

(56) References Cited

U.S. PATENT DOCUMENTS

| 4,481,529 | A |   | 11/1984 | Kerling |
| 5,216,492 | A | * | 6/1993 | Dorrough et al. ........... 348/185 |
| 5,576,859 | A | * | 11/1996 | Castleberry ................. 349/110 |
| 5,760,841 | A |   | 6/1998 | Kang |
| 5,767,830 | A | * | 6/1998 | Kawamura .................... 345/99 |
| 6,097,352 | A | * | 8/2000 | Zavracky et al. .............. 345/7 |
| 6,515,710 | B1 | * | 2/2003 | Koshimuta ................... 348/557 |
| 6,707,516 | B1 | * | 3/2004 | Johnson et al. ............... 349/78 |
| 6,707,591 | B1 | * | 3/2004 | Amm ......................... 359/290 |
| 6,788,011 | B1 | * | 9/2004 | Mueller et al. ............. 315/294 |
| 6,806,659 | B1 | * | 10/2004 | Mueller et al. ............. 315/295 |
| 6,831,624 | B1 | * | 12/2004 | Harrold ....................... 345/98 |

FOREIGN PATENT DOCUMENTS

EP 0 706 164 A1 4/1996

* cited by examiner

Primary Examiner—Paulos M. Natnael
(74) Attorney, Agent, or Firm—Hamilton, Brook, Smith & Reynolds, PC

(57) ABSTRACT

A color sequential display operative in one of two alternate modes. The first mode is a color sequential mode in which primary color images are displayed in successive frames while respective background light sources are simultaneously flashed on the display. The second mode is a monochrome mode in which the luminance Y signal is displayed in successive frames along with flashes of background white light.

10 Claims, 6 Drawing Sheets

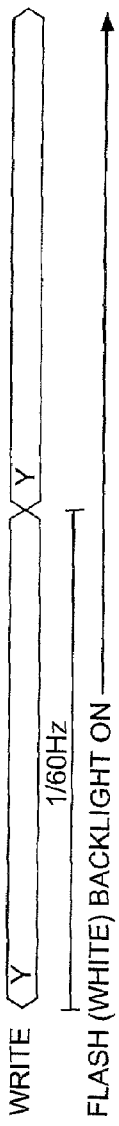

FIG. 2A

STANDARD MONOCHROME DRIVE
• LUMINANCE (Y) INFORMATION UPDATED AT 60 Hz RATE (50 Hz PAL)
• BACKLIGHT ON CONTINUOUSLY

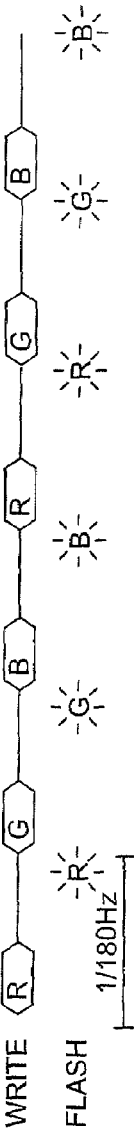

FIG. 2B

COLOR SEQUENTIAL DRIVE
• R,G,B SUBFRAMES UPDATED AT 3X OR 4X FIELD RATE
• EACH SUBFRAME HAS WRITE, WAIT, FLASH PHASES

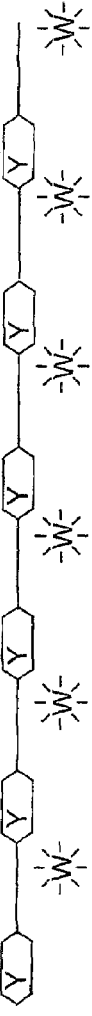

FIG. 2C

MONOCHROME DRIVE FOR COLOR SEQUENTIAL DISPLAY
• LUMINANCE (Y) SUBFRAMES UPDATED AT 3X OR 4X FIELD RATE
• FLASH WHITE BACKLIGHT (OR R,G,B BACKLIGHTS SIMULTANEOUSLY)

COLOR/MONO SWITCHED DISPLAY

BACKGROUND OF THE INVENTION

Flat-panel displays (FPD's) have been developed which utilize liquid crystals (LC) or electroluminescent materials to produce high quality images. These displays are expected to continue to supplant cathode ray tube (CRT) technology in more applications, due to FPDs relatively smaller size and weight. A promising route to large scale high quality liquid crystal displays (LCDs) is the active-matrix approach in which thin-film transistors (TFTs) are co-located with LCD pixels. An advantage of the active matrix approach using TFTs is the elimination of cross-talk between pixels, and the excellent grey scale that can be attained with TFT-compatible LCDs.

One method (spatial color) of producing colored images for flat panel displays is to use an array of primary colored pixels. In a common approach, a pattern of red, green, and blue filters is applied to a surface of an LCD. The display is illuminated with white light, but each pixel controls light of only one primary color.

The spatial color approach may have a coarse or "pixelated" appearance, particularly when displaying primary colors. Within a red area of the image, for example, all the green and blue pixels must be driven to black. Instead of a smooth red area, the observer may perceive a pattern of red dots on a black background.

An alternative method (sequential color) of producing colored images utilizes back lighting from the three primary colors, blue, green, and red. In this system, the display is scanned three times, once for each primary color. For example, to produce color frames at 60 Hz, the active matrix must be driven at a frequency of 180 Hz. At over 180 Hz, visible flicker is reduced. (See U.S. Pat. No. 6,097,352, issued Aug. 1, 2000 entitled "Color Display Panels" incorporated in its entirety herein by reference.)

An advantage of the color sequential system is the higher resolution obtained and reduced pixelation, as each pixel can display full color using three scans. On the negative side of the ledger are image artifacts, called "color breakup", resulting from the fact that red, green, and blue subimages are presented at slightly different times. Perception of color breakup may be subjective and highly dependent on the sensitivity of the viewer and/or the content of the video signal.

SUMMARY OF THE INVENTION

In some applications, it is desirable to have a color sequential display that can be operated in a monochrome mode if or when color breakup becomes objectionable. One complication is the fact that monochrome displays typically operate at a slower frame rate (50–60 Hz) than color sequential displays (180–240 Hz), and that LC devices are typically optimized for a particular frame rate.

Therefore, a need exists for a method and apparatus to circumvent this "color breakup" phenomenon in a simple and efficient manner.

In accordance with the invention, a sequential color display is provided which is primarily operable in a color sequential mode but which can be switched to a monochrome mode when color breakup is perceived to be objectionable. In the color sequential mode, the video image is divided into red, green, and blue subframes and updated at 3 or 4 times the field rate (50–60 Hz). Each subframe has a plurality of write periods, during which one of the primary color video signals is written sequentially, followed by a "wait" period at the end of which a respective background primary color light is flashed. To the extent "color breakup" is sensed, the drive circuits for the color sequential display are switched to monochrome mode of operation. This is accomplished by substituting the monochrome luminance (Y) video signal for the color signal during each write period and either flashing only a white light or simultaneously flashing all the primary colors at the end of each wait period.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 2A is a timing chart for describing the monochrome drive sequence.

FIG. 2B is a timing chart for describing the color drive sequence.

FIG. 2C is a timing chart for describing the monochrome drive substituted in a color sequential display.

DETAILED DESCRIPTION OF THE INVENTION

Figure 1:
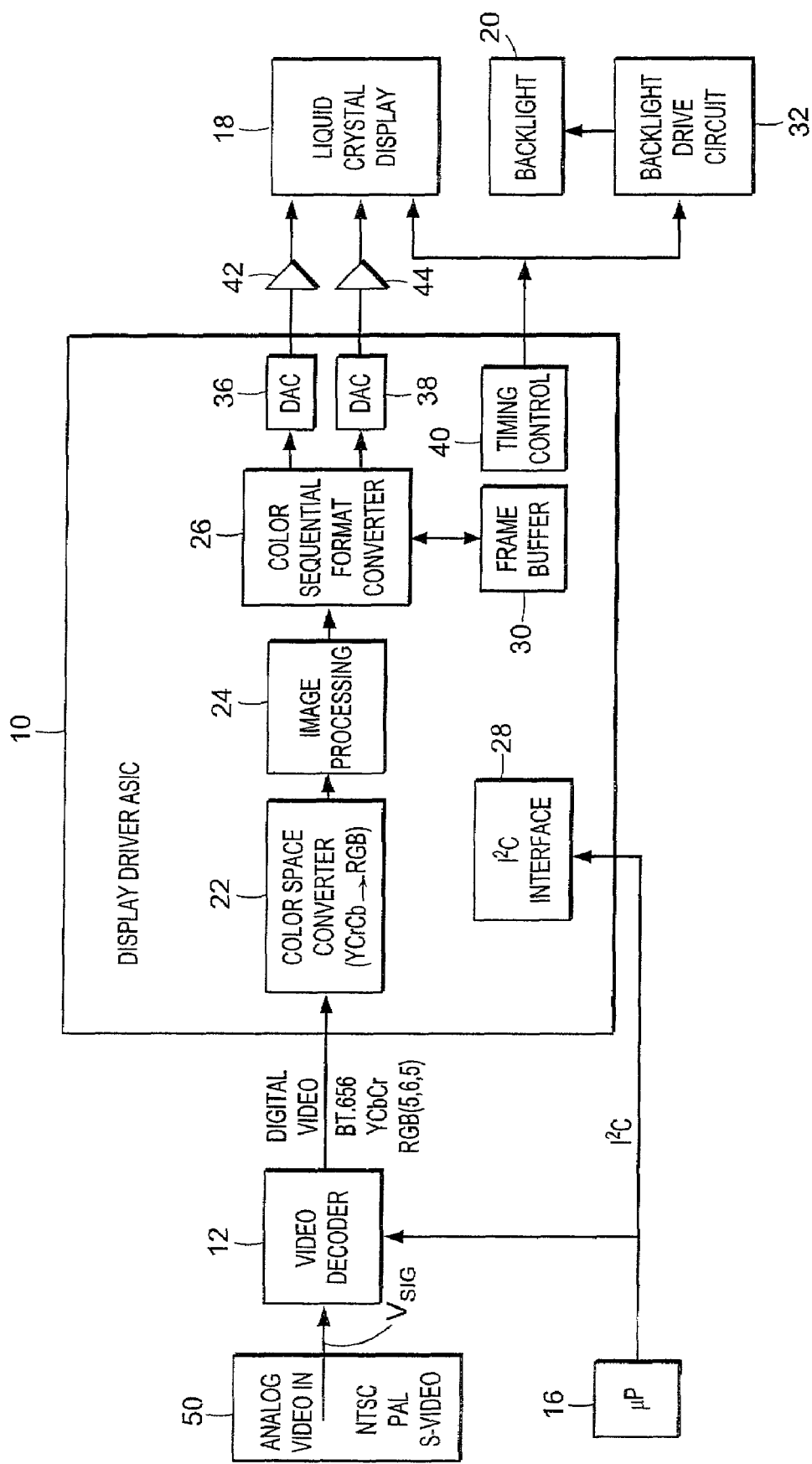
FIG. 1 is a block diagram showing the overall structure of a video system with a color sequential LED for the present invention.

A first embodiment of a display system will now be described in connection with the block diagram of FIG. 1. Analog video signals in composite (NTSC/PAL) or S-Video formats from a video source 50 such as a video camera or video broadcast station are coupled to a video decoder 12. The decoder converts the analog signals to digital signals under the control of microprocessor 16 and extracts various components of the standard composite video signal $V_{sig}$ and outputs digital video in any of several formats, including BT.656 with embedded sync, YCrCb with separate sync, or Red Green Blue (RGB) color signals. Note: The video decoder 12 is not needed if a digital video signal is available.

A display driver ASIC 10 accepts digital video input in standard format and outputs analog video to display 18 in color sequential format and generates timing and control signals for display 18 and external backlight drive circuit 32. A color space converter 22 converts video data to or from the luminance/chrominance (YCrCb) space and red/green/blue (RGB) color space as necessary. An image processing circuit 24 may perform such functions as horizontal scaling, vertical scaling, and gamma correction. Color sequential format converter 26 accepts video data from the image processing circuit 24 in standard row order and writes to frame buffer 30. Simultaneously, the format converter 26 reads from frame buffer 30 in color sequential order and outputs to DACs (Digital-to-Analog Converters) 36 and 38. For smooth motion, frame buffer 30 may contain enough memory for two complete frames or fields, so that one frame or field may be written into display 18 while the other is read. The DACs 42 and 44 produce analog video signals which are amplified by external video amplifiers and drive circuits 42 and 44 and coupled to display 18. I²C interface 28 accepts configuration commands from microprocessor 16 to set all programmable options in driver ASIC 10. Backlight drive circuit 32 described in detail in connection with FIGS. 3–6 accepts red, green, and blue flash signals to control current sources for red, green, and blue LEDs in backlight 20.

In the color sequential mode, the primary color signals are scanned into subframes of the display and at the same time backlights 20 are switched "On" under the control of backlight drive circuit 32 in accordance with the sequence illustrated in FIG. 2B. As shown therein, each subframe of display 18 is updated at 3 or 4 times the field rate of 60 or 50 Hz and divided into alternate primary color subframes. The subframes comprise red, green, or blue video image signals which are displayed (written) followed by a wait period, then a flash period when a respective primary color back light LED is flashed at the end of a 1/180 Hz period (3×60 Hz). Depending upon the brightness of the display, the write, flash and wait times will vary. In one embodiment, given a 1/180 Hz period, the write time is 1.6 ms, the flash time is 800 µs, and the wait time is remainder, or 3.15 ms.

Figure 3:
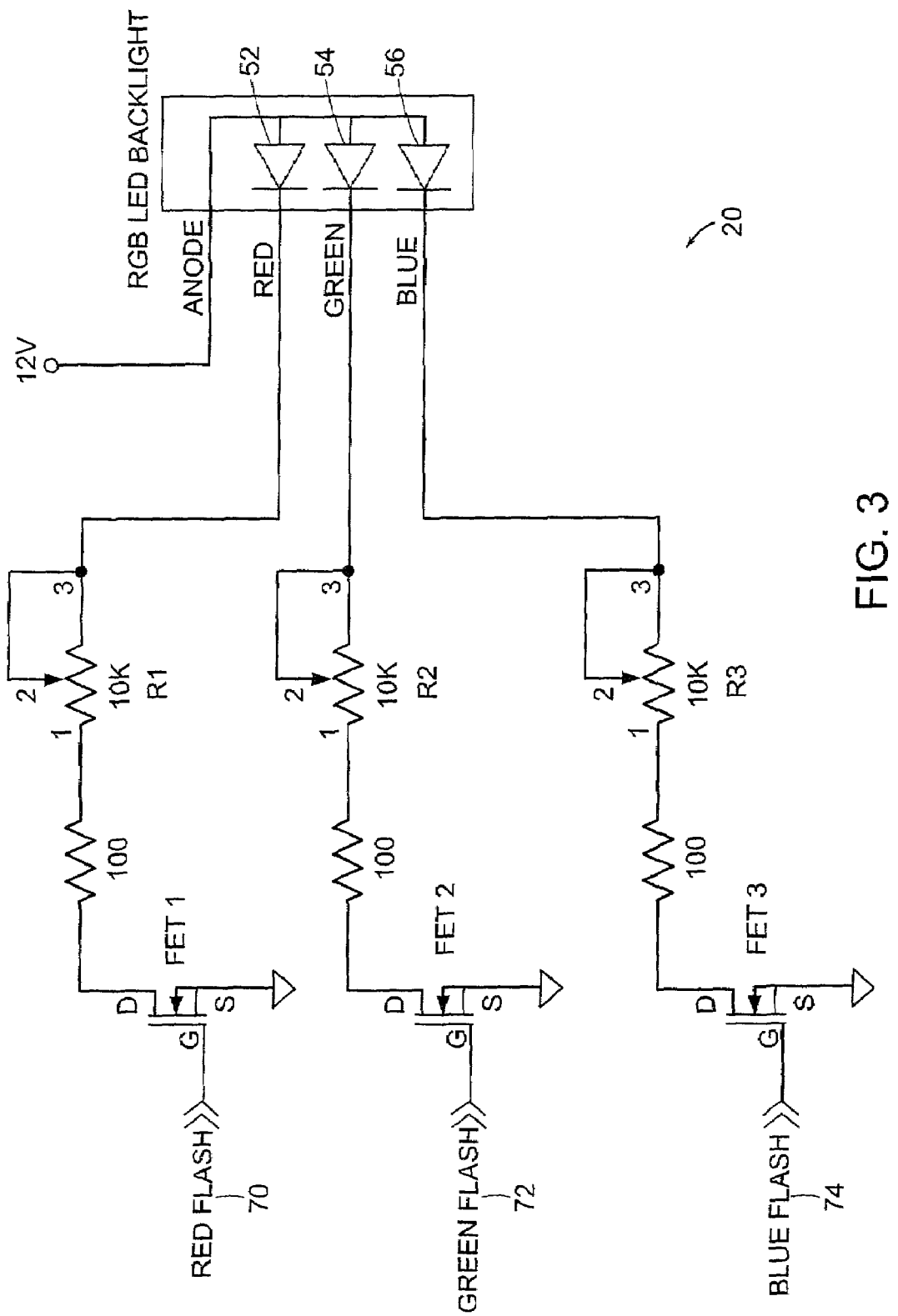
FIG. 3 is a backlight drive circuit for color mode operation.
Figure 4:
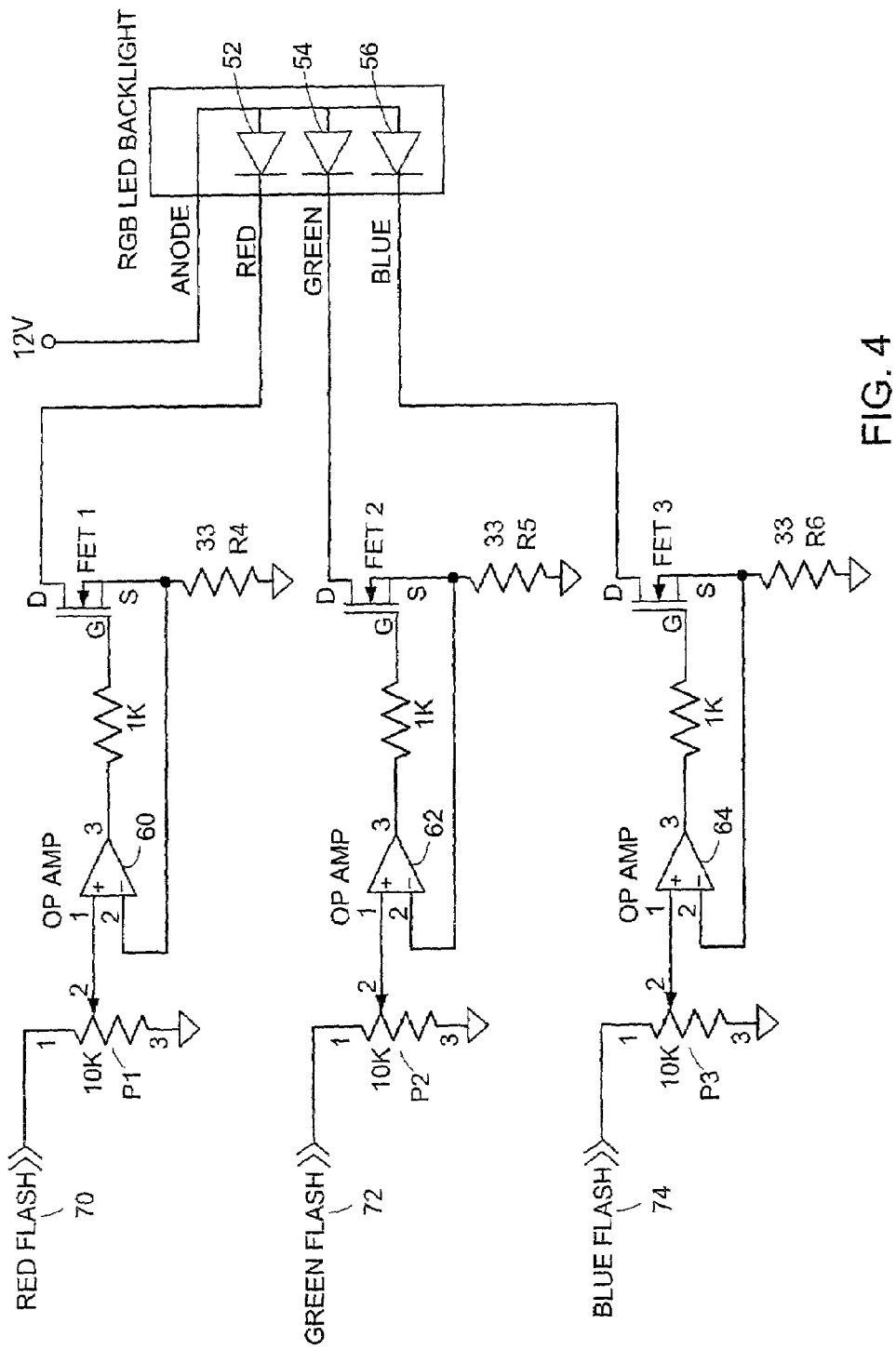
FIG. 4 is a backlight drive circuit for switchable mode.

A simple embodiment of the backlight circuit 32 for color mode operation is shown in FIG. 3. This implementation of circuit 20 uses 3 FETs (FET1, FET2, and FET3) as switches controlling three LEDs 52, 54, 56, respectively. Variable resistances are provided to adjust the currents through the LEDs 52–56. The currents will depend on the forward voltage of the LED, which may vary from one device to the next. A second implementation of color mode operation (FIG. 4) uses three operational amplifiers 60, 62, 64 for better controlled current sources. The op amps drive the gates G of the FETs 1, 2, and 3 to set the voltage dropped across source resistors R4, R5, R6 equal to the voltage at the input potentiometers, P1, P2, P3.

FIG. 2A illustrates a comparable subframe for a standard monochrome drive in which the luminance (Y) information is written at a 60 or 50 Hz rate and a white back light is continuously "On".

In accordance with the invention, when "color breakup" becomes excessive, the drive circuit 32 is switched to monochrome drive as shown in FIG. 2C wherein the luminance (Y) information is continuously updated into the subframes at 3 or 4 times the field rate while the backlight from source 20 is flashed at successive intervals. In the alternative, all primary color lights may be flashed simultaneously.

Figure 5:
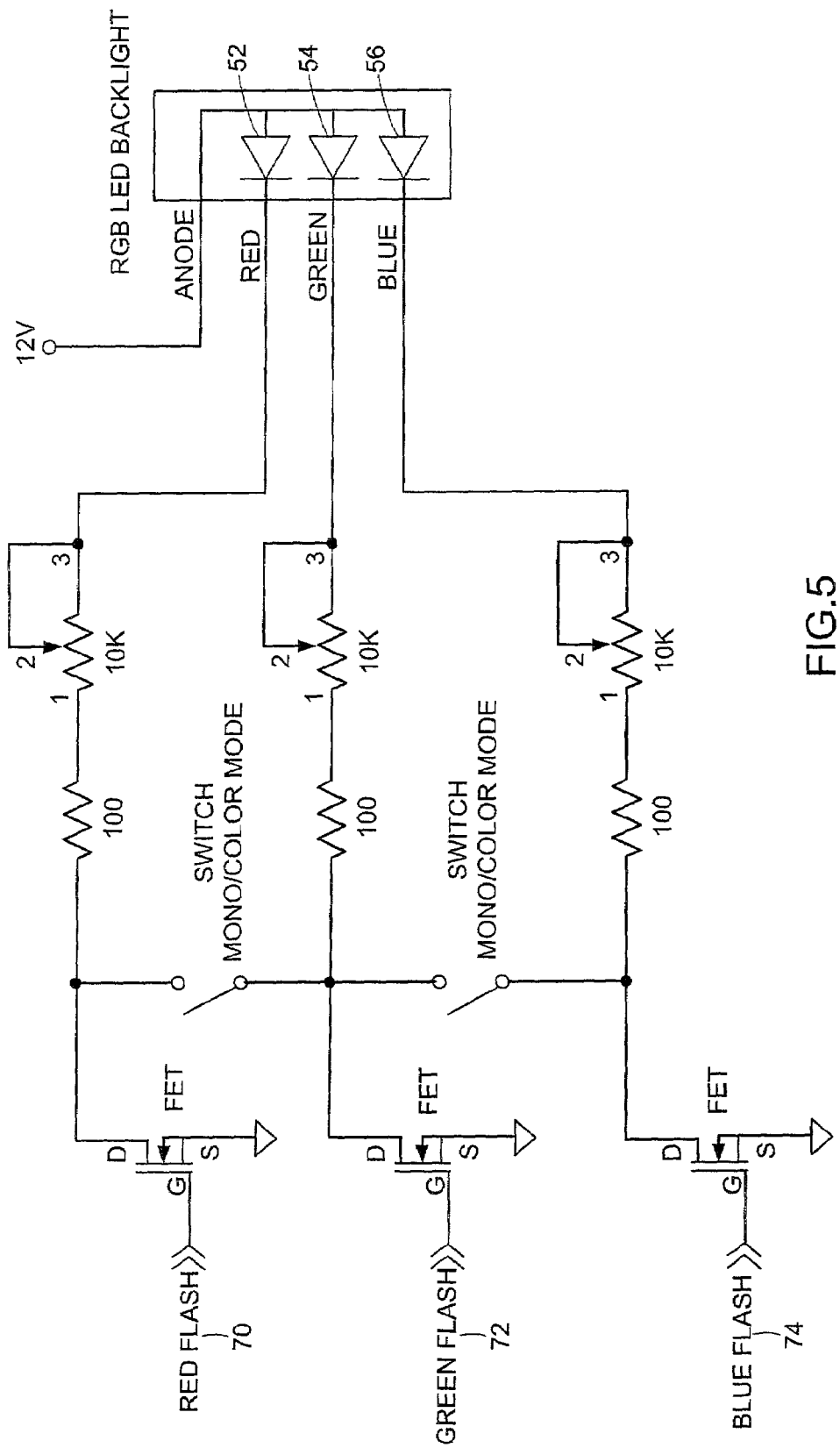
FIG. 5 is an alternate embodiment of FIG. 4.

FIG. 5 shows a simple embodiment of a switchable mode backlight drive circuit to enable one to switch from color sequential to mono mode. First, the Video Decoder 12 (FIG. 1) is programmed by the microprocessor 16 to set color gain to 0, thereby, nullifying the chrominance components. The R, G, and B components are then all equal to the Y luminance component. Using the simple backlight drive circuit of FIG. 5 switches S1 and S2 are engaged to connect the drains of three FETs 1, 2 and 3. This embodiment does not require any change to the Display Driver ASIC 10.

Figure 6:
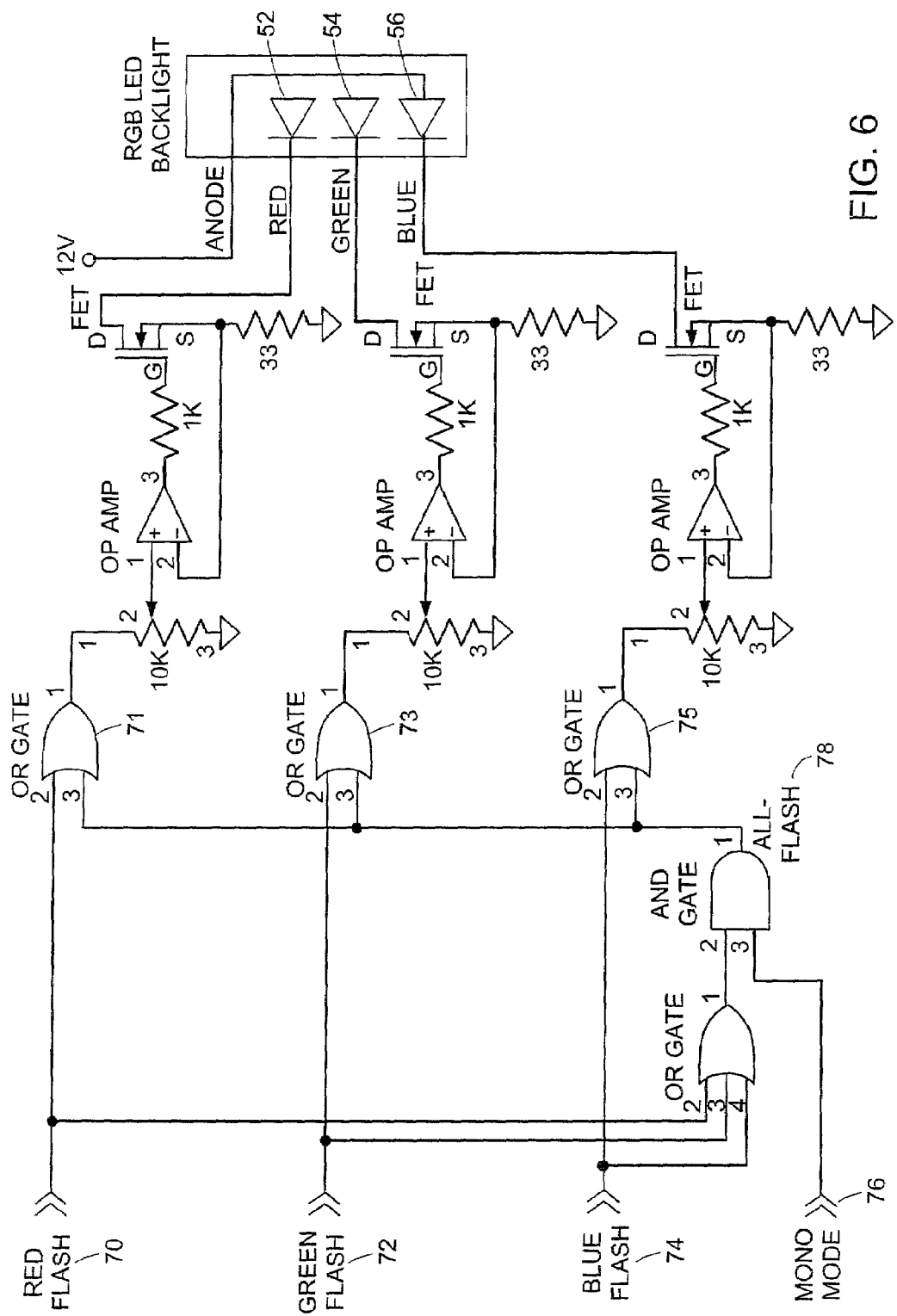
FIG. 6 is yet another alternate embodiment of FIG. 4.

FIG. 6 shows an alternate embodiment of the drive circuit which enables one to switch from color sequential to mono mode. In this version, the driver flashes all backlights simultaneously when in mono mode. The appropriate logic is shown in FIG. 6. Each R 52, G 54, and B 56 backlight is controlled by an OR gate (71, 73, 75 respectively) that has its output true if All-Flash signal 78 or respective R, G, and B (70, 72, 74 respectively) flash signal is asserted. The All-Flash signal 78 is true when the Mono Mode signal 76 is true and when the R, G or B (70, 72, 74 respectively) flash signal is true. In the operation of the video system using the embodiment of FIG. 6, any one step or combination of steps can be used:

1. Set the decoder color gain to 0 as in previous embodiment of FIG. 5;
2. Modify the driver ASIC 10 (FIG. 1) to zero Cb and Cr components in Color Space Converter 22 (FIG. 1);
3. Force the Cb and Cr inputs to zero at the ASIC input pins.

If the color sequential system 26 uses an INIT phase (as described in U.S. application Ser. No. 09/460,960, filed Dec. 14, 1999 incorporated herein by reference in its entirety), the INIT phase may be disabled in mono mode. This can be done by programming the driver ASIC 10 to skip the INIT phase, or by switching the INIT signal to the display.

While this invention has been particularly shown and described with references to preferred embodiments thereof, it will be understood by those skilled in the art that various changes in form and details may be made therein without departing from the scope of the invention encompassed by the appended claims.

What is claimed is:

1. A color sequential display system operable in a monochrome mode comprising:
    a) a video signal source which generates a composite video signal containing a luminance signal $Y_s$ and primary color signals $R_s$, $B_s$, and $G_s$3;
    b) a light source adapted to flash light of each of the primary colors R, B, or G or a white light W;
    c) a display optically coupled to the light source, said display having an array for displaying (i) an image of the $R_s$, $B_s$, and $G_s$, signals in succession at a rate of 150–240 Hz in a color sequential mode or (ii) displaying an image of the luminance signal $Y_s$ in succession at a rate of 50–60 Hz in a monochrome mode; and
    d) a control for the light sources which, in the color sequential mode, flashes light of each of the primary colors in synchronism with the respective image display of the $R_s$, $B_s$ & $G_s$ signals and in the monochrome mode, flashes the white light or light of all of the primary colors simultaneously in synchronism with the display of the luminance signal $Y_s$.

2. The system of claim 1 wherein the light sources comprises R, B and G and white LEDs.

3. The system of claim 1 in which the display is an active matrix display.

4. The system of claim 1 in which M is 50 Hz or greater and N is at least 3 tines M.

5. A method of operatmg a color sequential display system in a monochrome mode comprising:
    a) receiving a composite video signal containing a luminance signal Ys and primary color signals Rs, Bs, and Gs;
    b) generating light of each of the primary colors R. B, or G and a white light W;
    c) displaying (i) an image of the Rs, Bs and Gs signals in succession at a rate of N cycles per second in a color sequential mode or (ii) displaying an image of the luminance signal Ys in succession at a rate of M cycles per second in a monochrome mode; and
    d) in the color sequential mode flashing light of each of the primary colors in synchronism with the respective image display of the Rs, Bs & Gs signals and in the monochrome mode, flashing the white light or light of all of the primary colors simultaneously in synchronism with the display of the luminance signal Ys.

6. The method of claim 5 wherein the light sources comprises R, B and G and white LEDs.

7. The method of claim 5 in which the display is an active matrix display.

8. A color sequential display system operable in a monochrome mode comprising:
  a) an interface for receiving a composite video signal containing a luminance signal Ys and primary color signals Rs, Bs, and Gs;
  b) a light source coupled to the display and optically adapted to generate light of each of the primary colors R, B, or G and a white light W;
  c) said display having an array for displaying (i) an image of the Rs, Bs, and Gs signals in succession at a rate of N cycles per second in a color sequential mode or (ii) displaying an image of the luminance signal Ys in succession at a rate of M cycles per second in a monochrome mode; and
  d) a control for the light sources which, in the color sequential mode, flashes light of each of the primary colors in synchronism with the respective image display of the Rs, Bs & Gs signals and in the monochrome mode, flashes of the white light or light of all of the primary colors simultaneously in synchronism with die display of the lumunance signal Ys.

9. The system of claim 8 wherein die light sources comprises R, B and G and white LEDs.

10. The system of claim 8 in which the display is an active matrix display.

* * * * *

UNITED STATES PATENT AND TRADEMARK OFFICE
CERTIFICATE OF CORRECTION

PATENT NO. : 7,057,668 B2 Page 1 of 1
APPLICATION NO. : 10/127338
DATED : June 6, 2006
INVENTOR(S) : Frederick P. Herrmann It is certified that error appears in the above-identified patent and that said Letters Patent is hereby corrected as shown below:

Col. 4, line 51, Claim 4, delete "tines" and insert --times--
Col. 4, line 52, Claim 5, delete "operatmg" and insert --operating--
Col. 6, line 10, Claim 8, delete "die" and insert --the--
Col. 6, line 12, Claim 9, delete "die" and insert --the--

Signed and Sealed this

Fifteenth Day of August, 2006

JON W. DUDAS
*Director of the United States Patent and Trademark Office*